Patented Aug. 30, 1927.

1,640,602

UNITED STATES PATENT OFFICE.

HIPPOLYT DITTLINGER, OF NEW BRAUNFELS, TEXAS, ASSIGNOR, BY MESNE ASSIGNMENTS, TO THE DITTLINGER CROW PROCESS COMPANY, OF NEW BRAUNFELS, TEXAS, A CORPORATION OF TEXAS.

HYDRATION OF LIME.

No Drawing.      Application filed November 5, 1923.   Serial No. 672,799.

This invention relates to the treatment of oxides of lime or alkaline earth metals.

This invention has utility when used in connection with hydration of limes for imparting desired qualities, as controlling the plasticity.

Lime rock is found distributed quite generally. Calcium carbonates associated in varying proportions with magnesium carbonates from certain of such rock are the source of supply for alkaline earth oxides and hydrates used widely in construction and industrial operations. In construction operations desired properties are set and plasticity.

Plasticity is that property of the lime as made up into a putty or paste whereby it will spread freely. In practice it means a workman may take a trowel full of the lime putty and get a good thin spread on a surface with quick, easy movement and uniform distribution of the trowel full of the lime. When the lime has tendencies of not spreading well or poor plasticity, it seems to dry out, drag, or offer such resistance to spreading that it pulls apart and seems to gum or roll in particles.

In industrial operations prepared materials especially adapted for requirements, have advantages. In responding to this demand of the trade, hydrates or lime hydrate which in practice may be of high calcium, or calcium with more or less magnesium, is a step in responding to the trade demands. Hydrates of similar calcium or similar calcium and magnesium chemical properties vary in physical properties even as to set and as to plasticity.

As a material factor in presenting to the trade products to respond to trade demands of plasticity, control thereof is obtainable under the invention herein. This control is brought about in the course of hydration. The oxide or quick lime as subjected to the hydration undergoes exothermic reaction. It is found that by associating other materials with the lime during this seemingly nascent condition of the material, special properties may be uniformly imparted to the product.

The promotion of plasticity is possible under the invention herein. It is preferable that the medium introduced in the water to form the hydration liquor be soluble. Potassium permanganate has been used in a proportion by weight as low as 1/75 of 1% of the oxide. Acetic acid has been used, as well as potassium chlorate, potassium chloride, and ordinary salt or sodium chloride. In the use of sodium chloride, plasticity promotion has been effected with as small a quantity as 1/10 of 1% as to weight of the oxide. These control substances for the hydration liquor have been dissolved in the liquor before the liquor is added to the quicklime. The hydrate of this plasticity control has in instances been found in the form of a fibrous colloidal appearing substance which under twenty-five hundred diameter magnification resembles tiny plants like mistletoe. This is in a tangled sponge-like mass and has the sponge-like properties for retaining water to an extent for effective lubrication in bringing about ease in troweling when in the form of a putty. This is a non-crystalline form and has highly plastic properties successfully resisting the quick withdrawal of the water from suction of underlying absorptive layers on which it is spread.

In the disclosure herein, hydration control is determined. Speed of hydration may, in instances of plasticity control, be slowed up for more effective or thorough commingling and consequent reduction of the speed of the exothermic reaction, as well as lowering the temperature thereof. A substance of hard set value may be proportioned in combination with a substance of high plasticity value to have the compound of merit as a hard wall finish of good set and plasticity. The set ingredient of this compound may be used independently of the plasticity ingredient, say, in rough, sand, or brown coat work.

Plasticity has been promoted by the introduction at hydration of 5% and 10% of soapstone, talc or serpentine. These features of control, while of general importance, are more especially valuable in rendering high calcium limes plastic and thereby making such available even for finish coats for walls.

The treatments as herein disclosed specifically relate to the preparation of alkaline earth materials for such industrial uses as mortars, plaster, coatings, cements, casts, etc., wherein the material is molded, worked or formed in a semiliquid or putty state to retain the imparted form or position as automatically changing therefrom to a solid.

In coatings and plaster operations, spread or smoothness for ready applying, even in thin layers, is hereinbefore referred to as plasticity. The value after applied or worked is enhanced if there be absence of checking, and a resultant material which has properties of strength increase rather than disintegration, as exposed to atmosphere or weather conditions. The property of hardness and tensile strength follow from set and are developed as there is transition from the semiliquid to the solid in situ.

The hydration hereunder while it may be handled in batch, is conducted as a continuous process, the quick lime or oxid being subdivided to pass through say a one inch screen, while the hydrate as resulting is an oxid-free amorphous impalpable powder, when the product is placed upon the market as the dry hydrate, say in sacks. This hydrate may be stored, shipped, or kept for a period of time before mixing with additional water to make into the putty for use, or be incorporated with other materials or ingredients.

It seems proper to construe this operation as a controlled hydration, and that such control is artificial, and in reality a novel dispersion of the hydrate. The compounding during the hydration brings about results differing from compounding after hydration. This different product has predetermined physical properties which are definitely controlled, and incidental thereto it is noted that the amorphous impalpable powder makes up into a putty with a notable decrease in the water demand over a similar consistency putty from the uncontrolled hydrate of the same lime.

The ingredients recited are generally of ability for compounding, building up into complexes, or of the double salt forming capacity. This property or trait seems to have relevancy herein. An instance of high calcium lime as to one ounce of such hydrate has been found under usual or uncontrolled conditions to require 32.5 c. c. of water to bring it to the consistency of a standard putty. When this same high calcium oxid is submitted to controlled hydration hereunder, the resulting hydrate as to one ounce quantity thereof may be brought to the same paste or putty condition by a definitely less quantity of water than 32.5 c. c. This seems to be a corroboration of the double salt suggestion.

It seems to be logical that calcium oxid in the slaking operation has such a dominant affinity for moisture as to exercise during the exothermic reaction a possible partial hydrating control of the product of some intramolecular character. The conjecture is that the control ingredients may be in some way effective during the heat of slaking to tie across for holding more than one calcium atom in some double or multiple salt or water-of-chemical-combination manner.

The substance as used has been found most acceptable when hygroscopic and when associated with an acid radical, such radical being organic or a weak acid. The base radicals or elements are monovalent in potassium permanganate, potassium chlorate, potassium chloride, sodium chloride, acetic acid. The chlorate seems to react in the small percentages better than the chloride.

The reaction of these controls during the heat of the lime hydration brings about some dispersion which may be chemical, colloidal or most minute physical precipitation of the hygroscopic substance. However, in this dispersion the control may retain in itself, or impart to the associate atoms, at least to some measure, its hygroscopic trait. The degree of moisture modification is out of proportion to the low percentage of the control.

If there be condensation in the limits as herein disclosed as desirable, and if there be dispersion within the limits as herein found effective, such is not readily discernible upon magnification of twenty-five hundred diameters. Further, while the fine white material is described herein as amorphous, such may not be the fact, but in the magnification as conducted crystalline characteristics have not been noted, and it is accordingly presumed that such do not persist.

The product as thus produced for plasticity control, when formed into a putty, evinces a moisture affinity as to holding onto the water incorporated therewith in forming the putty, notwithstanding such water quantity for forming such putty is less than for the uncontrolled hydrate. By this affinity it is meant that in spreading such putty, say in blotter test, the putty resists blotter action tending to suck such moisture out of the putty, and in fact holds the moisture into itself and by such attribute retains its smoothness for troweling and the resultant plasticity improvement. The blotter test as conducted in practice involves taking a weighed quantity of dry hydrate, measuring the quantity of water which such hydrate powder requires in the production of a standard putty approaching the consistency as determined by specifications of the American Society for Testing Materials. This standard putty is defined in "Proceedings of the American Society for Testing Materials," volume 22, Part I, 1922, in the report of committee C–7 on lime, page 18. In conducting this blotter test, the putty is made up. An 18% absorption plate as specified by said committee C–7 is provided. A section of brass pipe about 1½" in diameter and ¼" deep is filled with the putty and laid on said absorption plate for two minutes. It is then observed whether it has become dry and hard or is still soft and wet. If it becomes hard at this stage of the test, its plasticity is poor. If it remains soft it is usually an indication of good plasticity which may be further tried out. To this end, it is spread with a spatula upon a blotter of normal size, say four by nine inches. The blotter is laid flat on a support and the spatula carried quantity of the putty is smeared by such spatula and spread over the blotter. In this spreading operation, a putty of poor plasticity will drag on the spatula at the third or fourth spread action, while a putty having plasticity as herein disclosed may permit the spatula to effect a spreading operation smoothly and easily for working the putty into a layer of a thinness to approximate that of a sheet of writing paper. If this quantity can be readily spread in an even thin layer to cover three fourths of such blotter it has good plasticity. The conduct of this blotter test discloses that the spatula charge of the poor plasticity material has moisture therefrom so quickly taken up by the blotter that with one spread attempt of the spatula, moisture may be shown on the opposite side of the blotter, while at the same lapse there is no evidence of moisture on the opposite side of the blotter when the material is of the higher grade of plasticity as effected by the treatment herein disclosed. In practice this moisture affinity means that the putty may hold its plasticity for thin coat or spreading upon a brown coat of plaster, upon brick or upon mortar. This moisture holding property is inherent throughout the mass, and the water of the putty coat as so uniformly disseminated is the physical answer to this plasticity improvement. Plasticity improvement may be construed as a set retarder. The duration of this hygroscopic action for moisture retention with smoothness for troweling may be controlled by mechanically mixing retarder controlled material with the plasticity controlled material. At once the troweling ceases, it is timely for the moisture retention to pass and that the body as formed may pass from the semi-liquid or putty state into a solid. By re-wetting the surface, it may be reworked.

The factors as discussed for control in reality may in a measure be construed as having to do with set. The controls as herein disclosed do not increase the apparent specific gravity of the dry hydrate powder product. The acid groups tend to promote hardness or quick setting. The plasticity or base control tends initially to slow up set.

It is logical to assume that chemical dynamics is the factor, and that the plasticity ingredients do not react, but do lose energy which energy reappears in large amounts to pervade the entire mass of the hydrate of the exothermic reaction, to the end that the desired control thereof is obtained.

What is claimed and it is desired to secure by United States Letters Patent is:

1. A dry powdered hydrated lime formed by slaking quick-lime with a solution of a plasticity-increasing reagent which hydrated lime has no greater apparent specific gravity than the product formed by slaking the same quick-lime without said reagent.

2. The process of producing a colloidal hydrate of lime of increased plasticity over the product formed by slaking the same quick-lime without the hereinafter specified reagent, which comprises slaking lime with an alkali-metal chlorate.

3. A dry powdered colloidal lime hydrate formed by slaking quick-lime with a solution of a plasticity increasing reagent, which hydrated lime has no greater apparent specific gravity than the product formed by slaking the quick-lime without said reagent, and which hydrated lime, as herein formed, has less moisture requirement for mixing into a putty than putty of the same consistency from the product formed by slaking the same quick-lime without said reagent.

In witness whereof I affix my signature.

HIPPOLYT DITTLINGER.